INVENTOR.
THEODORE F. ARONSON
FLOYD A. LYON

March 20, 1962 T. F. ARONSON ETAL 3,025,770
ENVELOPE BLANK FORMING MEANS AND METHODS
Filed Sept. 16, 1959 4 Sheets-Sheet 3

INVENTORS
THEODORE F. ARONSON
FLOYD A. LYON

March 20, 1962 T. F. ARONSON ETAL 3,025,770
ENVELOPE BLANK FORMING MEANS AND METHODS
Filed Sept. 16, 1959 4 Sheets-Sheet 4

INVENTORS
THEODORE F. ARONSON
FLOYD A. LYON

United States Patent Office 3,025,770
Patented Mar. 20, 1962

3,025,770
ENVELOPE BLANK FORMING MEANS
AND METHODS
Theodore F. Aronson, 60 Crescent Beach Road, Glen Cove, N.Y., and Floyd A. Lyon, Old Wheatley Road, Brookville, N.Y.
Filed Sept. 16, 1959, Ser. No. 840,397
6 Claims. (Cl. 93—63)

This invention relates to high speed means and methods for forming, cutting, and feeding envelope blanks.

This application is a continuation-in-part of our prior application, Serial No. 766,889, filed October 13, 1958, for Strip Feeding Means.

That application shows means for feeding a web to a first work location at constant speed, feeding the web intermittently at the work location, notching and punching the web with a reciprocating die at the work location, and cutting the web into pieces with a reciprocating knife at a second work location.

The present application is an improvement of our prior application in that it provides means for prescoring fold lines in the blanks simultaneously with the notching and punching. The prior method of prescoring has been to first cut the web into pieces, and then to prescore the separate blanks. The prior method was cumbersome in that it required additional separate handling of the pieces and an additional prescoring operation, and its registration of the prescoring was not comparable to the present method wherein the prescoring is done on the web before it is cut. In the present method the prescoring is done with a special attachment to the notching and punching die.

The present application also provides means for feeding the cut pieces in a laminated or spaced overlapping relation while retaining a firm grip on the web and the cut pieces at all times. Accurate spacing of the cut pieces is necessary for the further operations such as folding. The laminar feeding apparatus of the present invention generally comprises a lower driven belt adapted to receive the cut pieces from the reciprocating knife, reciprocating rollers adapted to move in synchronism with the knife and mounted above the lower belt which operate to clamp the last cut piece to the lower belt in an accurate spaced relation to the preceding pieces.

Air blast means are also provided at the cutting knife to blow down the trailing edge of the piece just cut in order that the leading edge of the web may be fed over the last cut piece.

Accordingly, a principal object of the invention is to provide new and improved envelope blank forming means.

Another object of the invention is to provide new and improved web or strip feeding, cutting, prescoring, and delivery means.

Another object of the invention is to provide new and improved high speed envelope blank forming means.

Another object of the invention is to provide new and improved high speed web processing means.

Another object of the invention is to provide new and improved means and methods for feeding a web or strip at constant speed to a first work location, feeding said web intermittently at said work location, punching, notching, and prescoring said web simultaneously at said work location, cutting said web into blanks at a second work location, and feeding said pieces from said second work location in laminated spaced overlapping relation.

Another object of the invention is to provide new and improved means for feeding pieces cut from a web in laminated spaced overlapping relation comprising a lower driven belt, a reciprocating roller mounted above said lower belt and adapted to clamp the piece being cut from the web to said lower belt and air blast means adapted to blow down the trailing edge of said last cut piece to permit the leading edge of the web to be fed over it.

Another object of the invention is to provide new and improved means for forming envelope blanks without sharp corners on the flaps.

These and other objects of the invention will become apparent from the following specification and drawings, of which:

Figure 1:
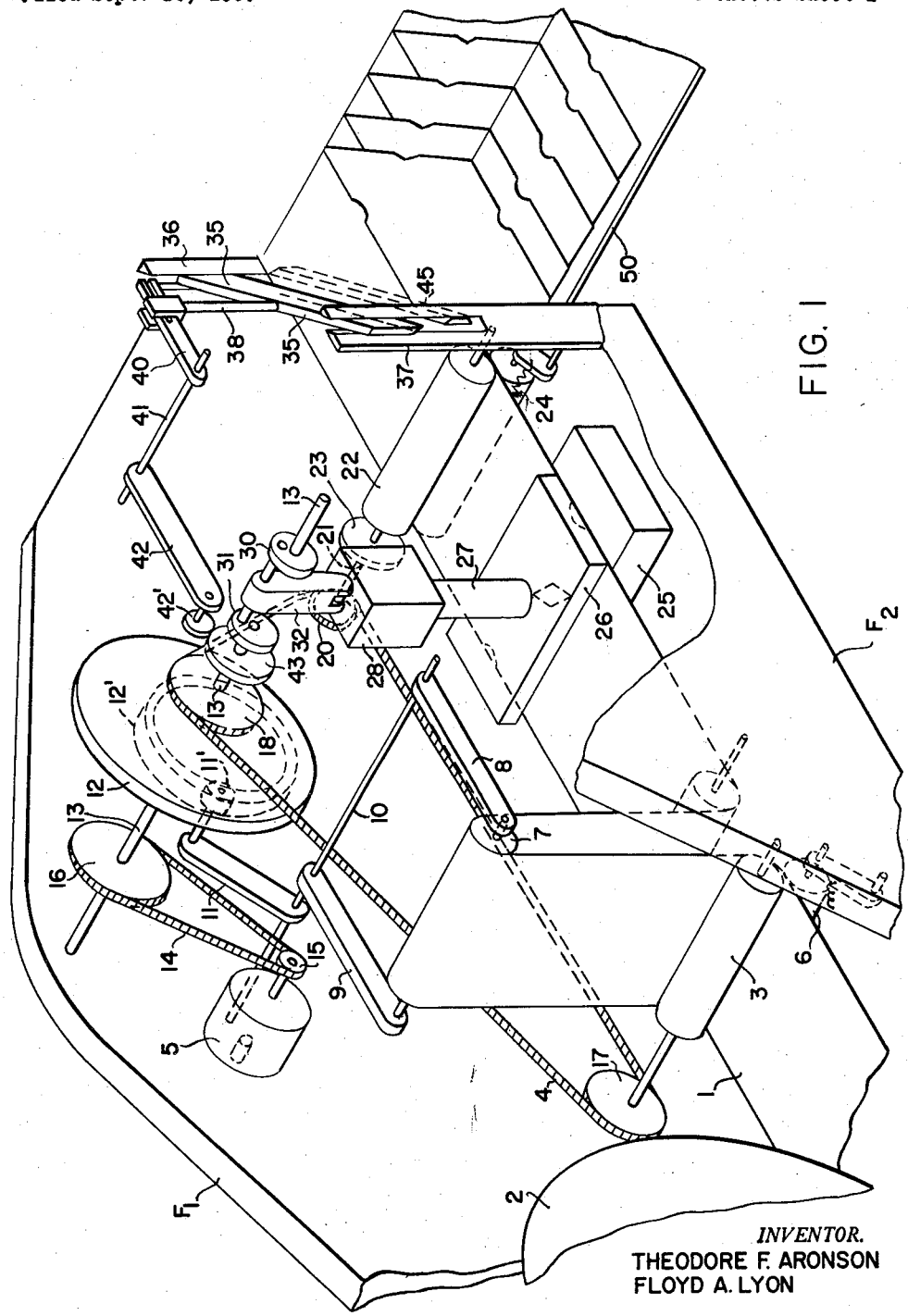
FIGURE 1 is a perspective view partially broken away of an embodiment of the invention.

FIGURE 1 shows a perspective view of an embodiment of the invention as disclosed in our prior application. All of the members are mounted in a pair of side frames $F_1$ and $F_2$, the frame $F_2$ being cut away to show the interior construction. The strip or web 1 is fed from a roll 2 by means of an input roller 3 which is mounted between and journalled to the frame members and which is driven by the constant speed motor 5, as will be discussed. Spring loaded pressure roller 6 bears against the roller 3.

The strip then passes over an idler roller 7 which is adapted to oscillate up and down. The roller 7 is mounted on arms 8 and 9, the other ends of which are mounted on the shaft 10 which is journalled between and to the frame members $F_1$ and $F_2$. An arm 11 is fixedly connected to the shaft 10 and has a cam follower 11' which rides in an eccentric groove 12' of the flywheel cam 12. The flywheel cam is mounted on a shaft 13 which is journalled to the frame and which is driven at constant speed by the motor 5 by means of the chain 14 by means of sprocket 15 connected thereto and sprocket 16 mounted on the shaft 13. The chain 4 passes over sprockets 17, 18 and 20 mounted on a shaft 21 which is journalled between and to the frame members and which is connected to drive the output roller 22 through a slip clutch 23, or the clutch may be eliminated and the roller 22 may slip on the web when it is retarded. Sprocket 20 is approximately half the diameter of sprocket 17 so that output roller 22 speed is approximately twice that of input roller 3 speed. A spring loaded pressure roller 24 is pivotally mounted on and between the frames and bears against the output roller 22.

The work station is illustrated as a punch and die set comprising a stationary lower die 25 and a reciprocating upper die 26 which is connected to shaft 27 connected to block 28 which slides in gibs (not shown) connected to the frame. The block 28 is pivotally connected to connecting rod 32 and is driven by a pair of crank arms 30 and 31 mounted on the main drive shaft 13 through connecting rod 32. The main drive shaft 13 continues over and is journalled to the frame $F_2$.

The apparatus thus far described operates as follows: The roller 3 pulls the strip at constant speed. The roller 7 oscillates up and down and manipulates the slack loop in the strip so that the motion of the strip past the work station is intermittent but has an average speed equal to the input speed. This arrangement permits high speed operation since the only thing that is intermittently varied in speed is the strip which has negligible weight. All of the relatively heavy apparatus moves at constant or smoothly varying speed.

The strip is taken away by the driven roller 22 bearing against the pressure roller 24. The strip movement by the roller 22 is intermittent since it operates through the slip clutch 23.

Additional work stations may be added on to or substituted for the work apparatus thus far described. For instance, the strip may then be printed, crimped, cut or glued as desired. FIGURE 1 illustrates a cutting knife 35 which is adapted to slide up and down in the guides 36 and 37 connected to the frames. The knife 35 is mounted on a shaft 38 and is drivably connected by means of the connecting member 40 connected to the shaft 41 which is journalled to the frame members at each end and which is rotated by means of the arm 42 and cam follower 42' which rides on the cam 43 mounted on the main shaft 13. The knife, therefore, operates in synchronism to cut the strip into blanks or pieces. The moving knife blade shears off the strip against the stationary blade 45 and the pieces may be stacked or fed onto a moving belt 50 mounted at an angle to the previous strip motion axis. The speed of the belt 50 would preferably be chosen to fan out the cut pieces so that they could be easily glued on one flap by running a glue roller across the laminated pieces and fed to other work apparatus, for instance, an envelope folding machine, located at the end of belt 50.

Figure 2:
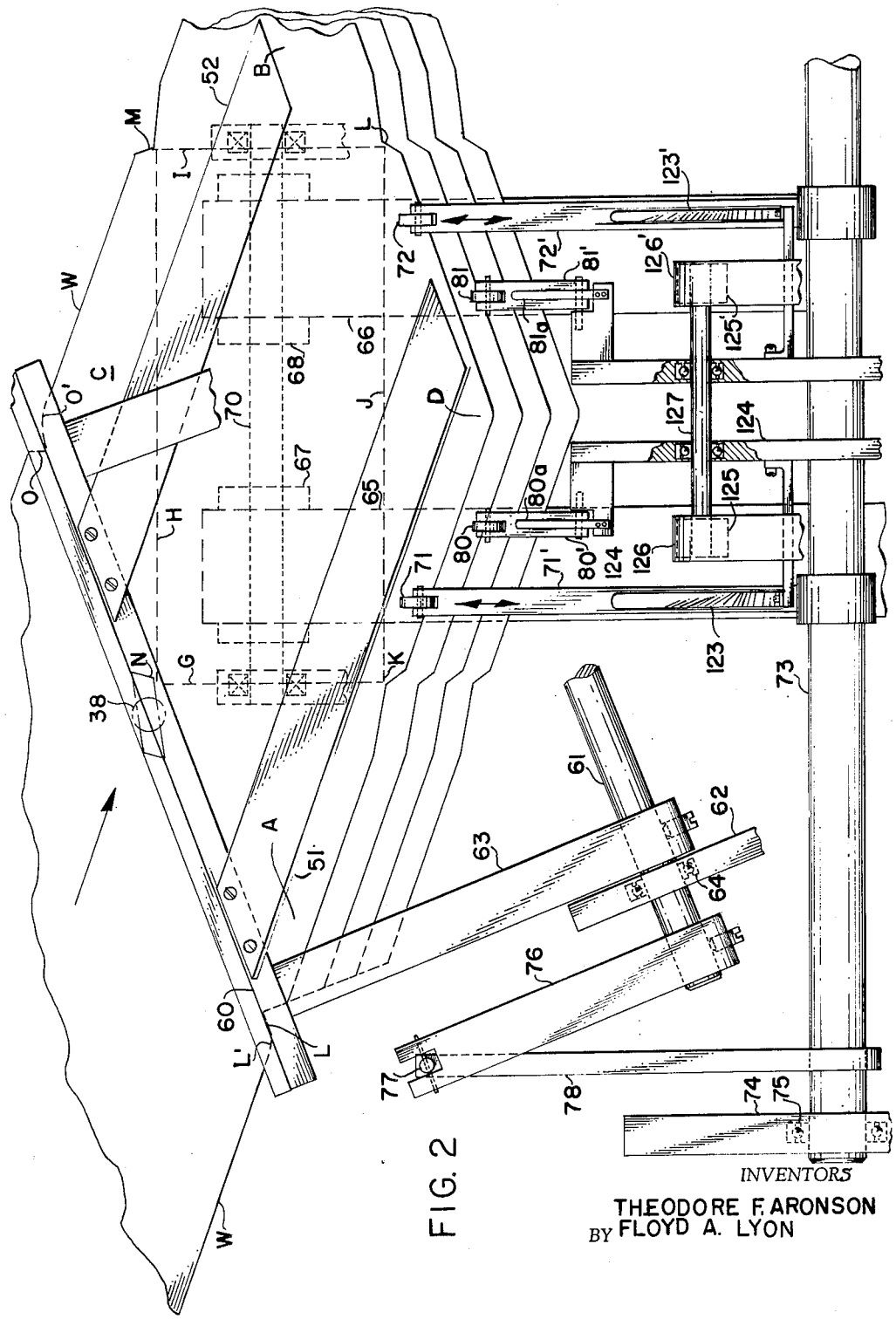
FIGURE 2 is a plan view of the takeaway means.

FIGURE 2 is a plan view illustrating the laminar takeaway means for the cut pieces and modified knife means. The web W is fed in the direction of the arrow past the knife edge 60 and is cut by the edge as previously described. The cut envelope blank includes side flap portions A and B and bottom and top flap portions C and D which are outlined by the edges of the blank and the dotted prescored fold lines G, H, I, and J. The notches K, L, M, N, and O have been cut by the reciprocating die, the notch N being formed by a diamond shaped punch in the center of the web which is then cut in half by the knife edge 60. Note that the notches L and O are curved to provide curves L' and O' instead of sharp points on the flap which is gummed and licked by the user's tongue. This is to prevent cutting or irritating the tongue. This curve can only be made with a reciprocating die and not with a rotary knife, and has not heretofore been possible with web cut blanks. The knife is pivotally mounted on shaft 61 by means of the connecting member 63. The shaft 61 is journalled to the frame member 62 by means of the bearing 64. The knife is oscillated up and down by connecting rod 38, FIGURE 1. Guides 51 and 52 are mounted on the knife to keep the paper web from rising.

The cut blank falls onto a lower pair of belts 65 and 66 which are mounted on sprockets 67 and 68 which are mounted on driven shaft 70 journalled to the frame. In order to remove the cut blank in a positive manner, it is immediately clamped to the lower belts 65 and 66 by means of the reciprocating rollers 71 and 72 which are mounted on the reciprocating members 71' and 72' which are adapted to be reciprocated in the direction of the arrows by means of the oscillating shaft 73 which is journalled to the frame 74 by means of the bearing 75. The shaft 73 is oscillated in synchronism with the driving knife by means of the linkage comprising connecting member 76 directly connected to the shaft 61, tie rod 77 which is pivotally mounted on the forked end of the member 76 at its end, and similarly mounted to the member 78 which is fixedly connected to the shaft 73.

In operation, the reciprocating rollers 71 and 72 are moved in synchronism with the knife motion so that just as the end blank is cut off the web, it is gripped by the rollers 71 and 72 riding over it and clamping it to the lower driven belts 65 and 66. The motion of the belts 65 and 66 then carries the cut blank under the fixed rollers 80 and 81 mounted on the members 80' and 81' fixedly connected to the frame. The motion of the reciprocating rollers 71 and 72 is such that they are withdrawn immediately after passing the cut blank to the fixed rollers 80 and 81 so that they will not interfere with the leading edge of the advancing web.

Figures 3, 4:
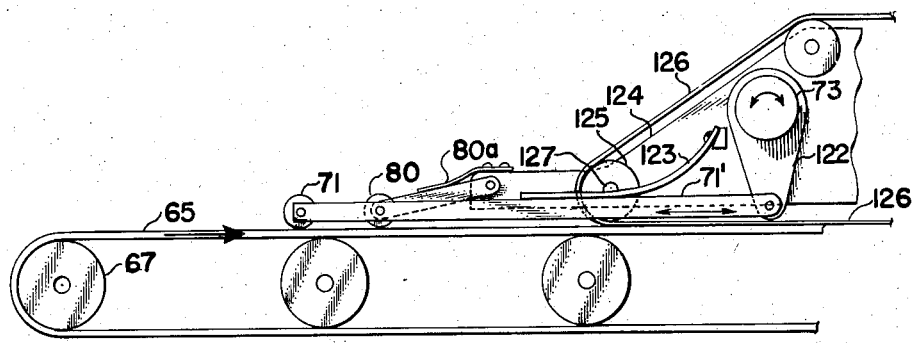
FIGURE 3 is a side view of the takeaway means.
FIGURE 4 is a side view of the cutting knife means.

FIGURE 3 shows a side view of the takeaway means for laminating the cut blanks overlapping with predetermined spacing. The roller 71 reciprocates in a direction shown by the arrow in synchronism with the knife. The roller 71 is mounted on the member 71' which is pivotally connected to the crank arm 122 which is fixedly connected to the oscillating shaft 73. The member 71' and roller 71 are pressed down against the lower belt 65 by means of the flexible spring members 123, 123', FIGURE 2, mounted on the frame. The reciprocating rollers 71, 72 are arranged so that they will move onto the edge of the cut piece at the time of cutting to maintain a grip on the cut piece at all times. Immediately thereafter the belt 65 moves the cut piece into clamping contact between itself and the rollers 80 and 81 spring loaded by springs 80a and 81a and at the same time the moving roller 71 moves out of the way so as not to interfere with the leading edge of the uncut web which moves rapidly into cutting position overlapping the cut piece. The moving belt 65 then moves the laminated, spaced, cut pieces into contact with the upper belts 126, 126' which are mounted on rollers 125, 125' which are rotatably mounted by shaft 127 on the frame member 124. Therefore, the cut pieces are under firm control at all times which enables the cut pieces to be accurately spaced on the takeaway belts.

FIGURE 4 shows an elevation view of a modified knife mounting different from the sliding knife of FIGURE 1. The knife 59 is pivotally mounted on the shaft 61 and is operated up and down by means of the reciprocating connecting rod 38. The cutting edge 60 is adapted to cut the paper web P which moves in the direction of the arrow against the stationary knife edge 84. A clamping block 85 is slidably mounted on the stud 86 and is spring loaded down by means of the spring 87. In operation, the clamping block 85 clamps the paper against the top of the stationary block 84 immediately before the moving knife edge 60 comes in contact with the paper.

An air blast is provided for blowing down the trailing edge of the cut piece 88. The air blast means comprises a slotted tube 89 mounted on the under side of the knife 59, the slot 90 being positioned in the direction of the trailing edge of the cut piece 88. The slotted air tube 89 runs along substantially the length of the cutting edge 60 and is connected to a source 92 of compressed air by means of the tube 91 through valve 93, which is operably connected on or to the shaft 61. The valve may be conventional and is connected so that the air blast is provided on the trailing edge of the of the cut piece at that part of the cycle when the cut is made.

The action of the air blast in a sense provides a layer or an air bearing between the cut piece 88 and the leading edge of the web so that the leading edge is literally floated across the cut piece by an air cushion while it is being pushed by the driving rollers.

Figure 5:
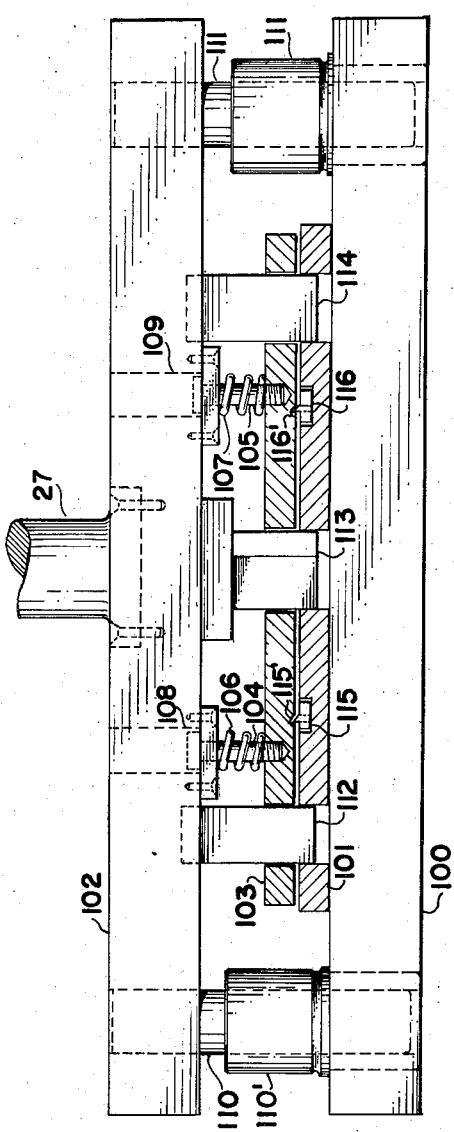
FIGURE 5 is a side view of the die means partially in section.

FIGURE 5 shows a side view of the die means for performing the punching, notching, and prescoring substantially simultaneously on the paper web 1 which moves perpendicular the plane of view of FIGURE 5. The die comprises a lower base 100 having a die plate 101 mounted thereon. The upper die comprises a first die plate 102 and a second die plate 103 which is movably connected to the first die plate by means of studs 104 and 105. The second die plate is spring loaded away from the first die plate by means of springs 106 and 107 and the studs are free to move in the slots 108 and 109 of the die plate 102. Suitable guide shafts 110 and 111 and corresponding bushings 110' and 111' are provided for guiding the motion of the upper die plate which is provided via the actuating shaft 27. The second die plate 103 is apertured to permit the punches 112, 113, and 114 to extend into corresponding recesses in the die plate 101. The prescoring is done by prescoring knives 115 and 116 which extend into corresponding recesses 115' and 116' in the spring loaded plate 103.

In operation, lower die 100 is stationary and the upper die moves up and down by means of the shaft 27. The spacing of the spring loaded plate 103 is chosen so that as the upper die descends, the plate 103 first clamps the web to the bottom die plate 101, at the same time prescoring the web with the small scoring knives 115 and 116. These knives extend only about .010 of an inch above the surface of the plate 101, and the recesses in plate 103 are larger so that the scoring knives will not cut the web. Substantially simultaneously with the scoring, the punches 112 and 114 and two corresponding punches behind them, not shown, make the four edge notches in the web. Two of these punches are curved to make curves L' and O' in notches L and O, FIGURE 2, at the apexes of the center flaps as discussed in connection with FIGURE 2. The center punch 113 makes the diamond cut in the center of the web. As the upper die is then lifted the spring loaded plate 103 tends to strip the web from contact with the punches.

The spring loaded plate 103 therefore performs the important functions of clamping the paper, prescoring the paper, and then stripping the paper from the punches.

Figure 6:
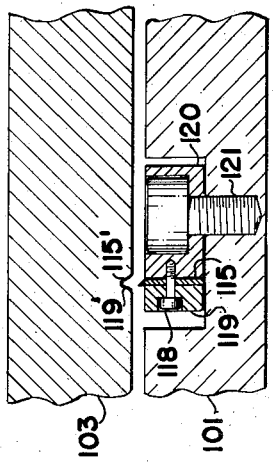
FIGURE 6 is a detail enlarged view of the scoring knife.

FIGURE 6 shows a detail view of the prescoring knife 115. The lower die plate 101 is recessed to accommodate the mounting block 120 for the knife 115. The mounting block is secured to the lower die plate 101 by means of the bolt 121. The knife 115 is adjustably secured to the block 120 by means of the clamping block 119 which is clamped to the block 120 by means of bolt 118. This arrangement permits adjusting the height of the prescoring knife above the upper level of the die plate 101. The prescoring knives extend around the lower die plate for forming the prescored lines G, H, I, J, shown in FIGURE 2. The recess clearance 115' in die 103 is much larger than knife 115 and offset so that the paper is pinched between knife 115 and edge 119' of recess 115, and not cut.

We claim:

1. Means for cutting a web into pieces comprising means for feeding a web intermittently, a moving knife, and continuous positive control means for spacing said cut pieces upon a driven belt under said web end, comprising a reciprocating roller to clamp the last cut piece against said belt in such manner that said web end is under continuous positive control, and means to reciprocate said roller in synchronism with said knife in such manner that said web end is clamped as it is cut loose whereby registration is maintained, said roller being then moved back to avoid interference with the leading edge of said web.

2. Means for cutting a web into pieces comprising means for feeding a web intermittently, a reciprocating knife, and continuous positive control means for spacing said cut pieces upon a driven belt under said web end, comprising a reciprocating roller to clamp the last cut piece against said belt, means to reciprocate said roller in synchronism with said knife in such manner that said web end is clamped as it is cut loose whereby registration is maintained, air blast means located adjacent said knife to blow down the trailing edge of said cut piece, and means to valve said air blast in synchronism with said knife, whereby the leading edge of said web may pass over said cut piece.

3. Continuous positive control means for accurately feeding overlapping pieces cut from an intermittently fed web comprising means to cut said web, a lower driven belt adapted to receive said pieces, a reciprocating roller mounted over said belt and adapted to move in and clamp said web end to said belt as said web end is cut off in such manner that said web end is under continuous positive control, said roller being then moved back to avoid interference with the leading edge of said web, and upper driven belt means adapted to receive said cut pieces from said recprocating roller, said upper and lower belt means being adapted to convey said cut pieces in spaced overlapping relationship.

4. Continuous positive control means for accurately feeding overlapping pieces cut from an intermittently fed web comprising means to cut said web, a lower driven belt adapted to receive said pieces, a reciprocating roller mounted over said belt and adapted to clamp said web end to said belt at substantially the same time as said web end is cut off in such manner that said web end is under continuous positive control, upper driven belt means adapted to receive said cut piece from said reciprocating roller, said upper and lower belt means being adapted to clamp and convey said cut pieces in positively controlled spaced overlapping relationship, and means to drive said cutting means and said reciprocating roller in synchronism.

5. Continuous positive control means for accurately feeding overlapping pieces cut from an intermittently fed web comprising means to cut said web, a lower driven belt adapted to receive said pieces, a reciprocating roller mounted over said belt and adapted to clamp said web end to said belt as said web end is cut off in such manner that said web end is under continuous positive control, upper driven belt means adapted to receive said cut piece from said reciprocating roller, said upper and lower belt means being adapted to convey said cut pieces in spaced overlapping relationship, means to drive said cutting means and said reciprocating roller in synchronism, air blast means located adjacent said knife to blow down the trailing edge of said cut piece, and means to valve said air blast in synchronism with said knife, whereby the leading edge of said web may pass over said cut piece.

6. Means for making envelope blanks comprising, means for feeding a web at constant speed to a first work location, means for intermittently feeding said web at said work location, reciprocating die means for notching, punching and prescoring said web simultaneously when said web is stopped at said work location, knife means for cutting said web when stopped at a second work location spaced a predetermined amount from said first location, means for feeding said cut web pieces in positively controlled spaced overlapping relation comprising a lower driven belt adapted to receive said pieces, reciprocating roller means mounted above said lower belt to clamp the last cut piece to said lower belt when cut from said web, and air blast means located at said knife to blow the trailing edge of the piece being cut down whereby the leading edge of the web may be fed over said cut piece.

References Cited in the file of this patent

UNITED STATES PATENTS

| 1,289,084 | Banzett | Dec. 31, 1918 |
| 1,291,089 | Novick | Jan. 14, 1919 |
| 1,837,727 | Novick | Dec. 22, 1931 |
| 1,839,491 | Novick | Jan. 5, 1932 |
| 2,261,972 | Matthews | Nov. 11, 1941 |
| 2,694,351 | Winkler et al. | Nov. 16, 1954 |
| 2,696,255 | Heywood | Dec. 7, 1954 |
| 2,718,828 | Buda et al. | Sept. 27, 1955 |

FOREIGN PATENTS

| 9,330 | Great Britain | April 27, 1907 |